US011959373B2

(12) United States Patent
Rangarajan et al.

(10) Patent No.: US 11,959,373 B2
(45) Date of Patent: Apr. 16, 2024

(54) OPERATING WELLBORE EQUIPMENT USING A DISTRIBUTED DECISION FRAMEWORK

(71) Applicant: Landmark Graphics Corporation, Houston, TX (US)

(72) Inventors: Keshava Rangarajan, Sugar Land, TX (US); Joseph Blake Winston, Houston, TX (US); Srinath Madasu, Houston, TX (US); Xi Wang, Houston, TX (US); Yogendra Narayan Pandey, Houston, TX (US); Wei Chiu, Sugar Land, TX (US); Jeffery Padgett, The Woodlands, TX (US); Aimee Jackson Taylor, Bogota (CO)

(73) Assignee: Landmark Graphics Corporation, Houston, TX (US)

( * ) Notice: Subject to any disclaimer, the term of this patent is extended or adjusted under 35 U.S.C. 154(b) by 765 days.

(21) Appl. No.: 17/047,837

(22) PCT Filed: Aug. 2, 2018

(86) PCT No.: PCT/US2018/045016
§ 371 (c)(1),
(2) Date: Oct. 15, 2020

(87) PCT Pub. No.: WO2020/027846
PCT Pub. Date: Feb. 6, 2020

(65) Prior Publication Data
US 2021/0115778 A1    Apr. 22, 2021

(51) Int. Cl.
*E21B 44/02*    (2006.01)
*E21B 44/00*    (2006.01)
(Continued)

(52) U.S. Cl.
CPC .............. *E21B 44/02* (2013.01); *E21B 44/00* (2013.01); *E21B 47/07* (2020.05); *E21B 49/00* (2013.01);
(Continued)

(58) Field of Classification Search
CPC ... E21B 2200/22; E21B 44/00; G05B 13/041; G05B 2219/45129
See application file for complete search history.

(56) References Cited

U.S. PATENT DOCUMENTS 7,032,689 B2    4/2006    Goldman et al.
7,483,693 B2    1/2009    Leung et al.
(Continued)

OTHER PUBLICATIONS

"Multiworld Testing Decision Service", Available Online at: http://mwtds.azurewebsites.net, Nov. 1, 2016, 2 pages.
(Continued)

*Primary Examiner* — Vincent H Tran
(74) *Attorney, Agent, or Firm* — Kilpatrick Townsend & Stockton LLP

(57) ABSTRACT

Aspects of the present disclosure relate to projecting control parameters of equipment associated with forming a wellbore, stimulating the wellbore, or producing fluid from the wellbore. A system includes the equipment and a computing device. The computing device is operable to project a control parameter value of the equipment using an equipment control process, and to receive confirmation that the projected control parameter value is within an allowable operating range. The computing device is also operable to adjust the equipment control process based on the confirmation, and to control the equipment to operate at the projected control parameter value. Further, the computing device is operable to receive real-time data associated with the forming of the wellbore, the stimulating of the wellbore, or the producing fluid from the wellbore. Furthermore, the
(Continued)

computing device is operable to adjust the equipment control process based on the real-time data.

20 Claims, 4 Drawing Sheets

(51) Int. Cl.
*E21B 47/07* (2012.01)
*E21B 49/00* (2006.01)
*G05B 13/04* (2006.01)
*G05B 19/4155* (2006.01)
*H04Q 9/00* (2006.01)
*E21B 43/26* (2006.01)

(52) U.S. Cl.
CPC ....... *G05B 13/041* (2013.01); *G05B 19/4155* (2013.01); *H04Q 9/00* (2013.01); *E21B 43/26* (2013.01); *E21B 2200/22* (2020.05); *G05B 2219/45129* (2013.01)

(56) References Cited

U.S. PATENT DOCUMENTS

| | | | |
|---|---|---|---|
| 7,496,533 | B1 | 2/2009 | Keith |
| 9,285,794 | B2* | 3/2016 | Wang ................. E21B 44/00 |
| 10,612,358 | B2* | 4/2020 | Xue .................. E21B 49/00 |
| 11,047,224 | B2* | 6/2021 | Ameen ............... E21B 44/04 |
| 2002/0120401 | A1* | 8/2002 | Macdonald ........... E21B 44/005 |
| | | | 702/6 |
| 2003/0168257 | A1 | 9/2003 | Aldred et al. |
| 2004/0256152 | A1* | 12/2004 | Dashevskiy ............ E21B 44/00 |
| | | | 175/25 |
| 2012/0118637 | A1 | 5/2012 | Wang et al. |
| 2012/0316787 | A1* | 12/2012 | Moran ................ E21B 44/00 |
| | | | 702/9 |
| 2015/0227841 | A1* | 8/2015 | Laing ................. E21B 49/003 |
| | | | 706/46 |
| 2016/0108714 | A1* | 4/2016 | Burress ............... E21B 44/00 |
| | | | 175/40 |
| 2016/0230530 | A1 | 8/2016 | Dykstra et al. |
| 2017/0122092 | A1* | 5/2017 | Harmer ............... E21B 47/07 |
| 2018/0171775 | A1* | 6/2018 | Santos ................ E21B 21/08 |
| 2019/0284921 | A1* | 9/2019 | Xue .................. E21B 47/024 |
| 2019/0284923 | A1* | 9/2019 | Vakil ................. E21B 44/06 |
| 2019/0292898 | A1* | 9/2019 | Quattrone ........... G05B 13/0265 |
| 2019/0345809 | A1* | 11/2019 | Jain .................. E21B 47/26 |
| 2020/0040719 | A1* | 2/2020 | Maniar ............... E21B 41/00 |
| 2021/0047910 | A1* | 2/2021 | Madasu ............... E21B 44/00 |
| 2021/0062634 | A1* | 3/2021 | Madasu ............... E21B 44/02 |
| 2022/0275718 | A1* | 9/2022 | Ambrus ............... E21B 44/00 |

OTHER PUBLICATIONS

International Application No. PCT/US2018/045016, International Search Report and Written Opinion, dated Apr. 26, 2019, 13 pages.

* cited by examiner

OPERATING WELLBORE EQUIPMENT USING A DISTRIBUTED DECISION FRAMEWORK

TECHNICAL FIELD

The present disclosure relates generally to devices for use in well systems. More specifically, but not by way of limitation, this disclosure relates to control of equipment used for well completion, well maintenance, and hydrocarbon production using a distributed decision framework.

BACKGROUND

A well system (e.g., an oil or gas well system) may include a wellbore drilled through a subterranean formation. The subterranean formation may include a rock matrix permeated by oil or gas that is to be extracted using the well system. Control of equipment used in wellbore operations, such as wellbore completion, well maintenance, and hydrocarbon production, is often provided by software tools that operate using algorithmic processes to estimate control settings of the equipment to achieve equipment efficiency. Controlling the equipment using the algorithmic processes results in a system that relies on an incomplete and potentially inaccurate representations of the well system and reservoir. Such reliance on incomplete representations may hinder performance of the equipment.

The software tools may rely on the algorithmic processes in isolation from other processes or data. That is, the software tools generate the control settings of the equipment based on initial attributes of a drilling site, but the software tools fail to receive updates based on data generated during the wellbore operation. Moreover, the algorithmic processes fail to update based on other processes operating simultaneously or in conjunction with the algorithmic processes during the wellbore operation. Accordingly, the equipment control based on the isolated algorithmic processes relies on incomplete representations of the wellbore operation.

DETAILED DESCRIPTION

Certain aspects and features of the present disclosure relate to using one or more equipment control processes to project equipment control parameter values. The equipment control processes use initial geological and geographical attributes to generate initial equipment control parameter values. These projections are used to operate equipment associated with the wellbore, and the projections are updated in real-time based on process confirmation and real-time data produced within the wellbore.

The disclosed method and system offer a distributed decision framework equipment control scheme based on physics-based processing principles that formulate control parameter values to drive equipment associated with a wellbore operation at optimal efficiency. The physics-based processing principles may rely on or be updated by confirmation of the control parameter values and real-time data generated during the wellbore operation, as discussed in detail below.

Illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
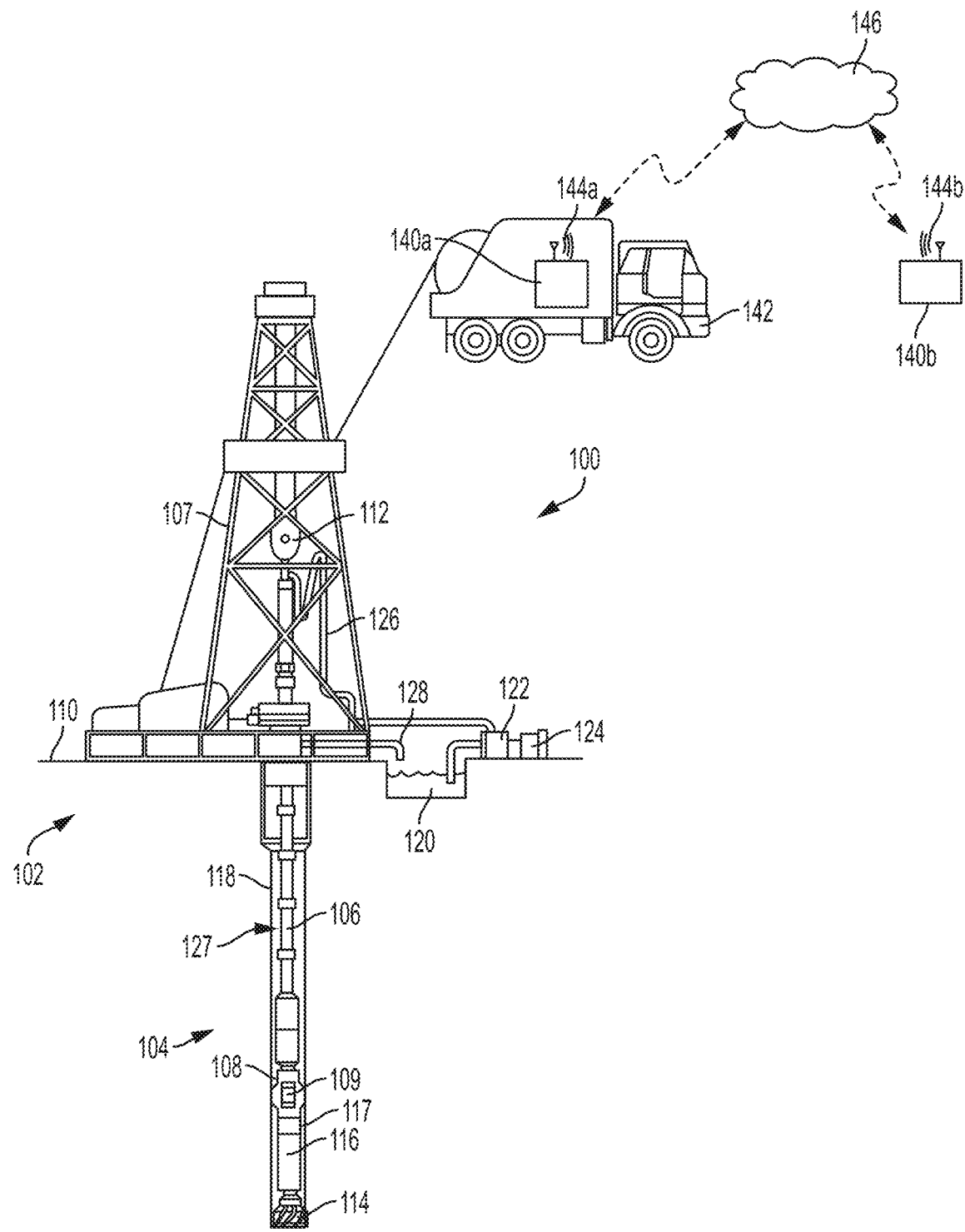
FIG. 1 is a cross-sectional view of an example of a drilling system according to some aspects.

FIG. 1 is a cross-sectional view of an example of a drilling system 100 that may employ one or more principles of the present disclosure. A wellbore may be created by drilling into the formation 102 using the drilling system 100. The drilling system 100 may drive a bottom hole assembly (BHA) 104 positioned or otherwise arranged at a downhole end of a drillstring 106 extending into the formation 102 from a derrick 107 arranged at the surface 110. The derrick 107 includes a kelly 112 used to lower and raise the drillstring 106. The BHA 104 may include a drill bit 114 operatively coupled to a tool string 116, and the BHA 104 may move axially within a drilled wellbore 118 as the drillstring 106 moves axially within the drilled wellbore 118.

The tool string 116 may include a logging while drilling (LWD) downhole tool 108 that uses one or more detectors 109 to determine conditions of the wellbore and formation, and return values for various parameters to the surface through cabling (not shown) or by wireless signal. The detectors 109 may include a camera, sound device, sensor, transducer, or other device that is responsive to a condition. The tool string 116 may also include a measurement while drilling (MWD) downhole tool 117. The MWD downhole tool 117 may use surveying tools to determine a path of the wellbore 118 and a position of the wellbore 118 in three-dimensional space, and return values for the path and position of the wellbore 118 to the surface through cabling or wireless signals. The MWD downhole tool 117 may include accelerometers, magnetometers, drill bit condition tools, gamma ray sensors, or other devices that are able to generate surveying information.

During operation, the drill bit 114 is rotated to drill the wellbore 118. The BHA 104 provides control of the drill bit 114 as it advances into the formation 102. Fluid or "mud" from a mud tank 120 is pumped downhole using a mud pump 122 powered by an adjacent power source, such as a prime mover or motor 124. The mud may be pumped from the mud tank 120, through a stand pipe 126, which feeds the mud into a mud bore (not shown) within the drillstring 106 and conveys the same to the drill bit 114. The mud may exit one or more nozzles (not shown) arranged in the drill bit 114 and in the process cool and lubricate the drill bit 114. After exiting the drill bit 114, the mud circulates back to the surface 110 via an annulus 127 defined between the wellbore 118 and the drillstring 106. In the process of circulating to the surface 110, the mud may return drill cuttings and debris from the wellbore 118 to the surface 110. The cuttings and mud mixture are passed through line 128 and are processed such that a cleaned mud may be returned downhole through the stand pipe 126.

Still referring to FIG. 1, the LWD downhole tool 108 and the MWD downhole tool 117 may be in communication with a computing device 140a, which is illustrated by way of example at the surface 110 in FIG. 1. In an additional embodiment, the computing device may be located elsewhere, such as downhole, or the computing device may be a distributed computing system including multiple, spatially separated computing components (e.g., 140a, 140b, downhole, or any combination thereof). Other equipment of the drilling system 100 described herein may also be in communication with the computing device 140a. In some embodiments, one or more processors used to control a drilling operation of the drilling system 100 may be in communication with the computing device 140a.

In FIG. 1, the computing device 140a is illustrated as being deployed in a work vehicle 142. However, the computing device 140a that receives data from the LWD downhole tool 108 and the MWD downhole tool 117 and controls the drilling operation of the drilling system 100 may be permanently installed surface equipment of the drilling system 100. In other embodiments, the computing device 140a may be hand-held or remotely located from the drilling system 100. In some examples, the computing device 140a may process at least a portion of the data received and transmit the processed or unprocessed data to an additional computing device 140b via a wired or wireless network 146. The additional computing device 140b may be offsite, such as at a data-processing center. The additional computing device 140b may receive the data, execute computer program instructions to issue commands to control the operation of the drilling system 100, and communicate those commands to computing device 140a.

The computing devices 140a-b may be positioned belowground, aboveground, onsite, in a vehicle, offsite, etc. The computing devices 140a-b may include a processor interfaced with other hardware via a bus. A memory, which may include any suitable tangible (and non-transitory) computer-readable medium, such as RAM, ROM, EEPROM, or the like, can embody program components that configure operation of the computing devices 140a-b. In some aspects, the computing devices 140a-b may include input/output interface components (e.g., a display, printer, keyboard, touch-sensitive surface, and mouse) and additional storage.

The computing devices 140a-b may include communication devices 144a-b. The communication devices 144a-b may represent one or more of any components that facilitate a network connection. In the example shown in FIG. 1, the communication devices 144a-b are wireless and may include wireless interfaces such as IEEE 802.11, Bluetooth, or radio interfaces for accessing cellular telephone networks (e.g., RF stage/antenna for accessing a CDMA, GSM, UMTS, or other mobile communications network). In some examples, the communication devices 144a-b may use acoustic waves, surface waves, vibrations, optical waves, or induction (e.g., magnetic induction) for engaging in wireless communications. In other examples, the communication devices 144a-b may be wired and can include interfaces such as Ethernet, USB, IEEE 1394, or a fiber optic interface. The computing devices 140a-b can receive wired or wireless communications from one another and perform one or more tasks based on the communications.

While FIG. 1 depicts the drilling system 100 where the computing devices 140a-b receive data from the LWD downhole tool 108 and the MWD downhole tool 117 for use in controlling equipment of the drilling system 100, control of other systems using the computing devices 140a-b is also contemplated. For example, the computing devices 140a-b may receive performance data related to hydrocarbon production systems, wellbore casing and cementing systems, wellbore fracturing systems, wellbore maintenance programs, or any other wellbore technologies. The computing devices 140a-b may receive the performance data, execute computer program instructions to issue commands to control the operation of the wellbore technology, and apply those commands to equipment of the wellbore technology. In some aspects the performance data may be considered "real-time" data as the performance data is collected and transmitted to the computing devices 140a-b as the wellbore equipment is operated.

Figure 2:
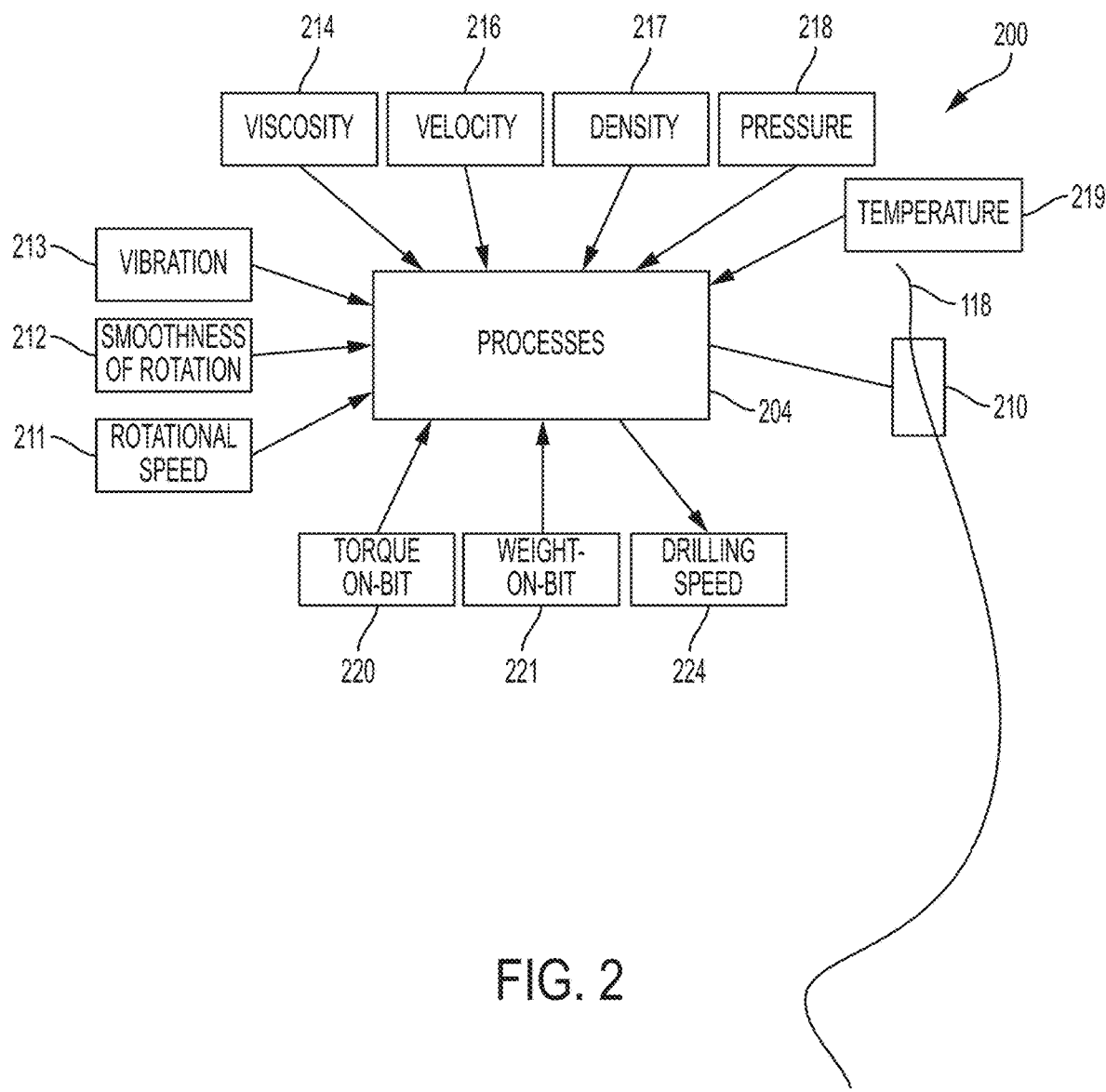
FIG. 2 is a schematic diagram of a system for controlling equipment associated with a wellbore using one or more processes according to some aspects.

FIG. 2 is a schematic diagram of a system 200 that uses one or more processes 204 to control equipment in a wellbore. Computer program instructions include the one or more processes 204 that may be executable by a processor to apply physics-based principles, data received from the LWD downhole tool 108, data received from the MWD downhole tool 117, confirmation received from a drilling operator or automated system, or any combination thereof to control equipment 210 associated with the wellbore 118. The combination of the processes 204, the collected data, and the confirmation received from the drilling operator may all function as components of a distributed decision framework. That is, the decision-making authority to control the equipment 210 does not rest on a single component of the distributed decision framework, but on the combination of all of the components.

Input data may include values for drill bit rotational speed 211, smoothness of rotation 212, vibration 213 of the drillstring, fluid viscosity 214, vertical velocity 216, formation density 217, formation pressure 218, downhole temperature 219, torque-on-bit 220, weight-on-bit 221, any other values related to wellbore completion, or any combination thereof. Any or all of these values can vary spatially. The equipment may be for any of various uses, including but not limited to wellbore formation, wellbore stimulation, wellbore production, or wellbore maintenance. Controllable parameters may be applied to the equipment 210 over multiple iterations.

For example, if the equipment 210 is the equipment associated with the drilling system 100, the controllable parameter may include drilling speed 224. That is, the one or more processes 204 may provide an optimized drilling speed to the equipment 210 based on the received input data, historical drilling data, and physics associated with drilling the wellbore 118. In an example, the optimized drilling speed 224 output by the one or more processes 204 may represent a drilling speed that balances drilling effectiveness of the drill bit 114 with wear on the drilling system 100. The historical drilling data used as an input to the one or more processes 204 may represent drilling effectiveness of drilling speeds while drilling wellbores in similar geological formations and/or geographical locations to the wellbore 118. In this manner, the historical data is able to alter the one or more processes 204 to account for regional variations to drilling operations.

In another example, the equipment 210 may be associated with a fracturing operation. In such an embodiment, the controllable parameter may include fracturing fluid pressure provided to the wellbore 118. The one or more processes 204 may provide an optimized fracturing fluid pressure to the equipment 210 based on the received input data, historical fracturing data, and physics associated with fracturing operations in the wellbore 118. The optimized fracturing fluid pressure output by the one or more processes 204 may represent the fracturing fluid pressure that balances fracturing effectiveness with wear on a fracturing system. The historical fracturing data used as an input to the one or more processes 204 may represent the effectiveness of fracturing fluid pressures while performing a fracturing operation in similar geological formations and/or geographical locations of the wellbore 118. In this manner, the historical data is able to alter the one or more processes 204 to account for regional variations to fracturing operations. Other wellbore equipment and controllable parameters associated with the other wellbore equipment that are optimized by the one or more processes 204 are also contemplated within the scope of the present disclosure.

Figure 3:
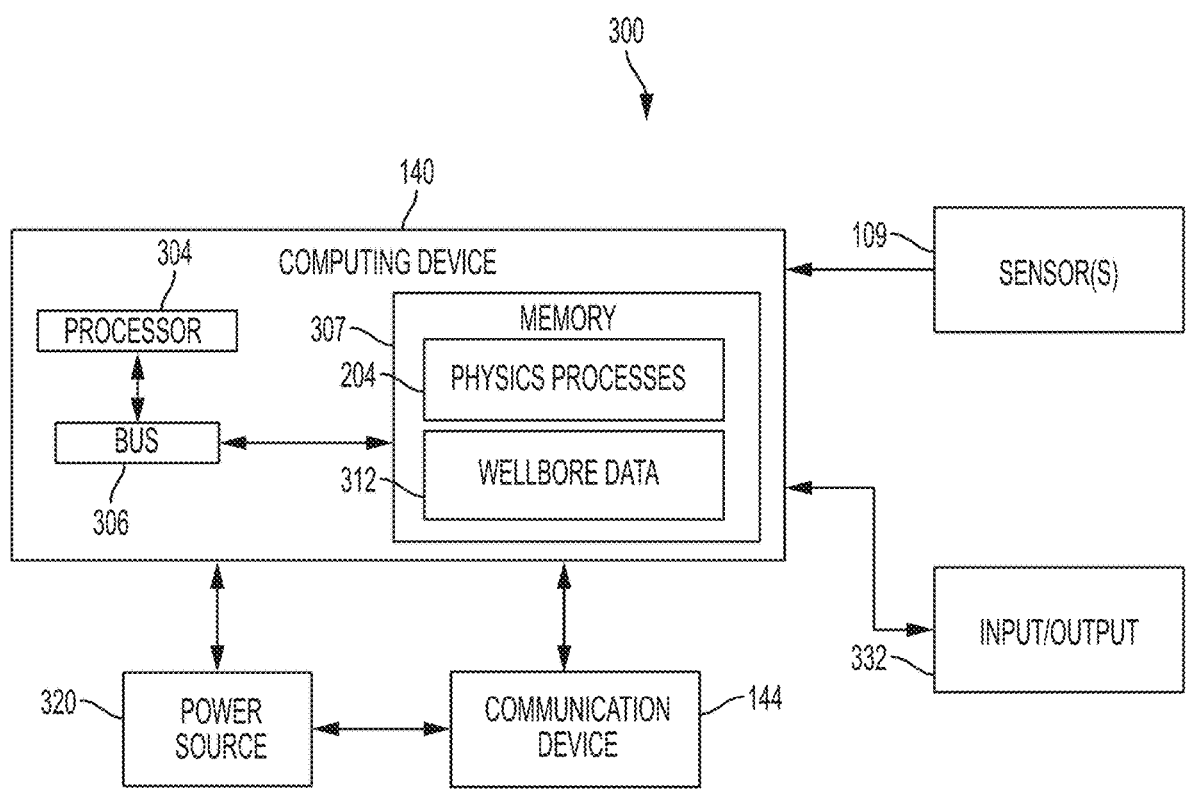
FIG. 3 is a block diagram of a system for producing and using one or more processes to operate wellbore equipment according to some aspects.

FIG. 3 is a block diagram of an example of a system 300 that uses one or more processes to control the equipment 210 associated with the wellbore 118 according to some aspects. In one or more examples, the components shown in FIG. 3 (e.g., the computing device 140, power source 320, and the communications device 144) may be integrated into a single structure. For example, the components may be within a single housing. In other examples, the components shown in FIG. 3 may be distributed (e.g., in separate housings) and in electrical communication with each other.

The system 300 includes the computing device 140. The computing device 140 may include a processor 304, a memory 307, and a bus 306. The processor 304 may execute one or more operations for obtaining data associated with a subterranean reservoir and controlling equipment associated with the wellbore 118 that will penetrate or is penetrating the subterranean reservoir. The processor 304 may execute instructions stored in the memory 307 to perform the operations. The processor 304 may include one processing device or multiple processing devices. Non-limiting examples of the processor 304 include a Field-Programmable Gate Array ("FPGA"), an application-specific integrated circuit ("ASIC"), a microprocessor, etc.

The processor 304 may be communicatively coupled to the memory 307 via the bus 306. The non-volatile memory 307 may include any type of memory device that retains stored information when powered off. Non-limiting examples of the memory 307 include electrically erasable and programmable read-only memory ("EEPROM"), flash memory, or any other type of non-volatile memory. In some examples, at least part of the memory 307 can include a medium from which the processor 304 can read instructions. A non-transitory computer-readable medium can include electronic, optical, magnetic, or other storage devices capable of providing the processor 304 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

In some examples, the memory 307 may include computer program instructions for executing and using the one or more processes 204 to determine optimized control of the equipment 210. The one or more processes 204 may rely, at least in part, on wellbore data 312 located within the memory 307. The wellbore data 312 applied to the one or more processes 204 may be used to determine optimized parameter values for one or more controllable parameters associated with the equipment 210 acting on the wellbore 118 (e.g., drilling speed, fracturing fluid pressure, hydrocarbon production rate, etc.). The memory 307 may also include computer program instructions for executing the one or more processes 204 and any additional operation steps in an appropriate order. Additionally, the memory 307 may include computer program instructions for distributing algorithms of the one or more processes 204 and any additional operation steps to processors 304 with available processing bandwidth. For example, several of the processes 204 may be run simultaneously to make full use of the processing resources of the computing device 140. This algorithm distribution may enhance the distributed decision framework of the one or more processes 204 by enabling multiple processes 204 to generate solutions to the same problem (i.e., the projected control parameter values) simultaneously.

The system 300 may include a power source 320. The power source 320 may be in electrical communication with the computing device 140 and the communication device 144. The communication device 144 may be connected to wellbore equipment used for formation, stimulation, or production. In some examples, the power source 320 may include a battery or an electrical cable (e.g., a wireline). In some examples, the power source 320 may include an AC signal generator. The computing device 140 may operate the power source 320 to apply a signal to the communication device 144 to operate the equipment used for wellbore formation, wellbore stimulation or wellbore production with controllable parameters. For example, the computing device 140 may cause the power source 320 to apply a voltage with a frequency within a specific frequency range to the communication device 144. In other examples, the computing device 140, rather than the power source 320, may apply the signal to communication device 144.

The communication device 144 of FIG. 3 may include or may be coupled to a wireless communication system to control equipment remotely. In some examples, part of the communication device 144 may be implemented in software. For example, the communication device 144 may include instructions stored in the memory 307. The communication device 144 may receive signals from remote devices and transmit data to remote devices. For example, the communication device 144 may transmit wireless communications that are modulated by data. In some examples, the communication device 144 may receive signals (e.g., associated with data to be transmitted) from the processor 304 and amplify, filter, modulate, frequency shift, and otherwise manipulate the signals.

The system 300 may receive input from detector(s) 109 (e.g., the LWD downhole tool 108 and the MWD downhole tool 117), which may be deployed in the wellbore 118 shown in FIG. 1. The system 300 in this example also includes input/output interface 332. Input/output interface 332 may connect to a keyboard, pointing device, display, and other computer input/output devices. An operator may provide input using the input/output interface 332. Such input may include confirmation that the optimized control parameter output by the one or more processes 204 is within an available operating range.

Figure 4:
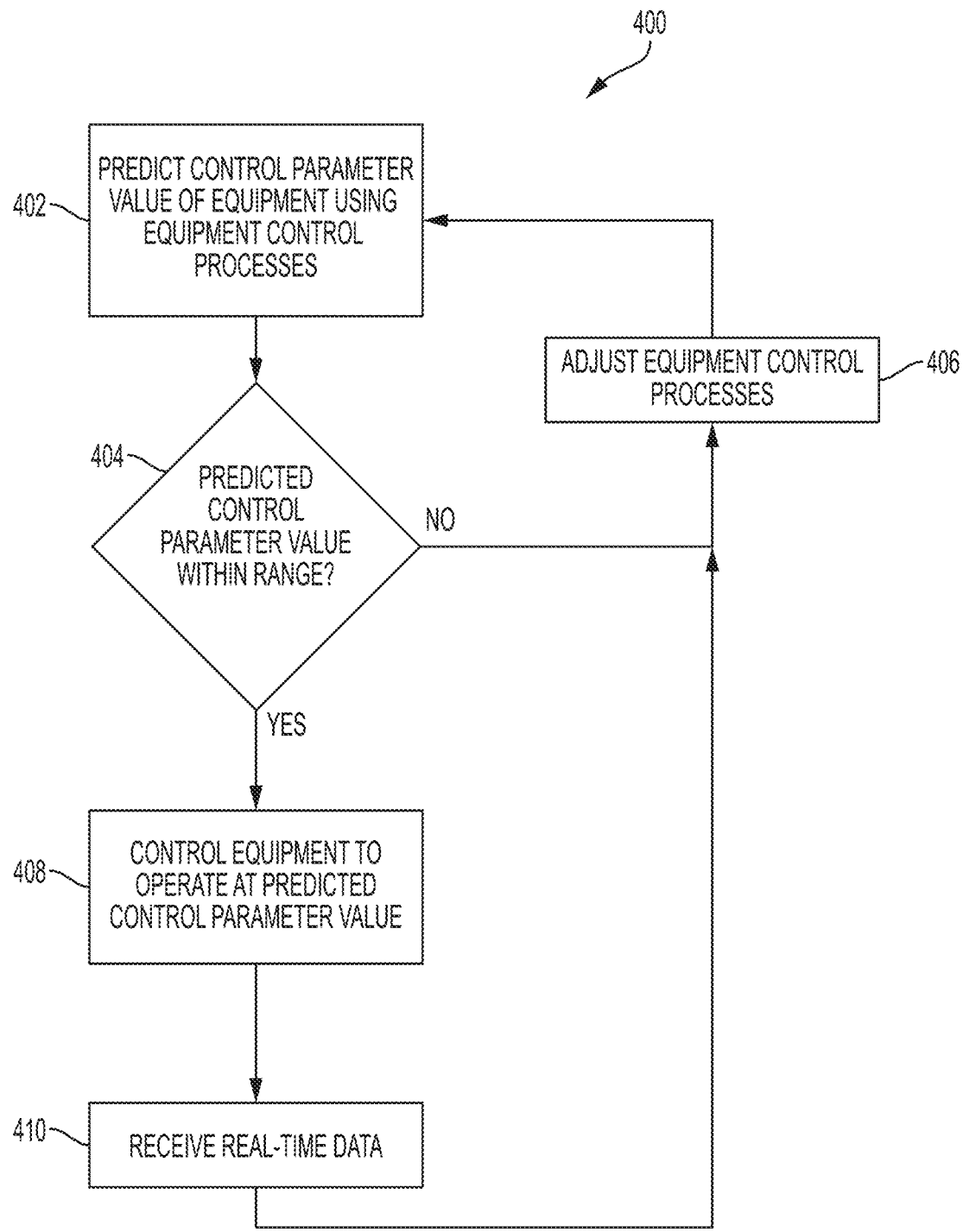
FIG. 4 is a flowchart of an example process for using the one or more processes to generate control parameters of equipment relating to forming a wellbore, stimulating the wellbore, or producing fluid from the wellbore according to some aspects.

FIG. 4 is a flowchart of an example process 400 for using the one or more processes 204 to generate control parameters relating to forming the wellbore 118, stimulating the wellbore 118, or producing fluid from the wellbore 118. While the description of the process 400 provided below describes the process 400 with reference to drilling operations of the wellbore 118, it may be appreciated by those skilled in the art that the process 400 may also be applied to other oil and gas operations (e.g., stimulation of the wellbore 118, production from the wellbore 118, maintenance operations at the wellbore 118, etc.). At block 402, the computing device 140 may establish a projection of a control parameter value using the one or more processes 204. The projection of the control parameter may be based on initial assumptions about a location of the wellbore 118. For example, when the wellbore 118 is drilled in West Texas, the initial assumptions may dictate that control parameters are set at a first value, and when the wellbore 118 is drilled in the tar sands of Canada, the initial assumptions may dictate that the control parameters are set at a second value that is different from the first value.

These initial control parameter values may be established using the one or more processes 204. In one or more examples, the one or more processes 204 may be stochastic optimization processes, deep learning processes, reinforced learning processes, production rule based processes, or any combination thereof. The processes 204 may take initial assumptions (e.g., geography inputs, known geological data of the drilling area, time of year, drilling equipment being used, historical drilling data, etc.) and generate control parameter values that instruct the drilling equipment to begin drilling using the projections of the one or more processes 204.

The stochastic optimization process, which may be used as a process 204 to project the control parameter values of the drilling system 100, is a process that generates an optimization output based on random input values. As used at block 402, the stochastic optimization process may receive input variables associated with the initial assumptions and generate an optimized output of the control parameter values. As used herein, the term "optimized output" may be used to describe an output used to control the equipment 210 (e.g., drilling equipment) in a manner that the one or more processes 204 determine to be most efficient when considering the input variables. For example, the optimized output of the stochastic optimization process may be indicative of an optimal rotation speed and an optimal weight-on-bit of the drill bit 114 to achieve a drilling speed that the stochastic optimization process identified as achieving optimal drilling efficiency.

The stochastic optimization process may be well suited for a synthesis of complex mechanical systems. In particular, stochastic optimization processes are often less sensitive to local minima and are well suited at finding global minima over all input values. Further, the stochastic optimization processes may provide a clear picture of an Edgeworth-Pareto optimal set, which provides an indication of a point at which one factor cannot be increased without the detriment of another factor. For example, the Edgeworth-Pareto optimal set determined by the stochastic optimization process may include the optimal rotation speed and the optimal weight-on-bit of the drill bit 114 that combine to achieve optimal drilling efficiency without the rotation speed or the weight-on-bit negatively affecting the other.

One or more deep learning processes may also be available for use as the processes 204 to project the control parameter values of the drilling system 100. The one or more deep learning processes may be used independently of the stochastic optimization process, or the outputs of the one or more deep learning processes may be applied as inputs to the stochastic optimization process. In applying additional process outputs as inputs to the stochastic optimization process, the stochastic optimization process may converge on an optimized control solution to the drilling system 100 with greater accuracy. As an example, the deep learning processes may be processes that are taught to provide control parameter value outputs based on the same initial assumptions used in the stochastic optimization process. The deep learning processes may also be updated continuously and in real-time or near real-time as additional input data is generated while drilling the wellbore 118.

The deep learning processes may be advantageous in that the deep learning processes may include capturing first principle's (e.g., scientific laws), reducing a need to specifically identify most important inputs into a system, and solving problems that prove difficult to solve using other techniques. To train the deep learning processes, a sufficient amount of data may be identified, cleansed, and made available for training and testing the deep learning processes. Different portions of the data made available for training and testing may be used to train the deep learning processes.

For example, one of the deep learning processes receives sets of inputs and associated results, and the deep learning process builds a trained model based on the sets of inputs and associated results. Several of the deep learning processes may be trained using different portions of the data made available for training and testing. Once the deep learning processes are trained, the deep learning processes may be tested by applying inputs from the data made available for training and testing and by comparing the results of the deep learning processes to the known results associated with the inputs. One or more of the deep learning processes with the most accurate performances may be selected for use as the processes 204 to project the control parameter values of the drilling system 100. As mentioned above, these deep learning processes may also be "trained" in real-time or near real-time as the input data and results are generated while drilling the wellbore 118.

Production rule based processes may also be used as at least one of the one or more processes 204 to project the control parameter values of the drilling system 100. The production rule based processes may receive the outputs of the other processes (e.g., the stochastic optimization process, the deep learning processes, etc.) and apply a set of rules to generate additional projected control parameter values. Similar to the deep learning processes, the projected control parameter values of the projection rule based processes may be fed into the stochastic optimization process as an input to further the robustness of the stochastic optimization process.

The production rule based processes may handle two different types of decision making. The first type of decision making may be referred to as forward chaining. For example, if a certain result occurs, then the rule based system identifies that task 'A' should be performed. If the certain result does not occur, then the rule based system identifies that task 'B' should be performed. The second type of decision making handled by the production rule based processes may be referred to as reverse chaining. Reverse chaining may work from a present or given state, and the rule based processes may attempt to understand how the present or given state occurred. For example, if the wellbore 118 has been drilled to a certain depth, the reverse chaining production rule based process may attempt to determine the factors (e.g., rotational speed of the drill bit, weight-on-bit, drilling time, etc.) that resulted in the wellbore 118 reaching such a depth.

When multiple different processes are used to generate projected control parameter values, the outputs of each process may be provided to the stochastic optimization process as inputs. In this manner, a single output that relies on each of the processes may be provided at block 402 as the projected control parameter values for the drilling system 100. In other embodiments, only a single process may be used at block 402 to generate the projected control parameter values for the drilling system 100.

Additionally, one or more reinforced learning processes may be available for use as a portion of the processes 204 to project the control parameter values of the drilling system 100. As an example, at block 404, a determination may be made about whether the projected control parameter values from block 402 are within an acceptable operating range of the equipment 210. The determination at block 404 may be provided as confirmation that the projected control parameters are within an operation envelope of the equipment 210. In one or more examples, a drilling operator may receive the projected control parameter values, and the drilling operator may provide an indication regarding whether the solution is within an appropriate range. In such an example, the drilling operator may receive an indication of optimal weight-on-bit and rotational speed of the drill bit 114. If either of the parameters are beyond a range of operating parameters known by the drilling operator, the drilling operator will reject projected control parameter values. In such an embodiment, the one or more processes 204 may be adjusted at block 406 to account for the rejection by the drilling operator, and a new control parameter value may be projected at block 402 taking into account the adjustment to the one or more processes 204.

In one or more embodiments, the rejection or acceptance of the projected control parameter values by the drilling operator may be received by the computing device 140 as a verbal input. In such an embodiment, the computing device 140 may decode the verbal input and determine whether the verbal input has accepted or rejected the projected control parameter values. Further, the verbal input, or any other type of confirmation received by the computing device 140, may be provided in a scaled framework. For example, the drilling operator may indicate that the projected control parameter values are substantially far from an operating envelope of the equipment 210, or the drilling operator may indicate that the projected control parameter values are close to the operating envelope. In either instance, the computing device 140 may adjust the one or more processes 204 at block 406 using the scaled confirmation data. The confirmation indication may enhance the distributed decision framework of the one or more processes 204 by distributing decision-making authority to more than just the multiple processes 204. For example, the processes 204 may generate the projected control parameter values, but another input (e.g., the confirmation) verifies if the projected control parameter values are allowable.

In another embodiment, block 404 may be accomplished with an automated system. For example, the computing device 140 may include operation envelopes for the drilling system 100 based on the location in which the wellbore 118 is drilled. If the computing device 140 receives projected control parameter values outside of the operation envelope of the drilling system 100, the computing device 140 may reject the projected control parameter values. In such an embodiment, the one or more processes 204 may be adjusted at block 406 to account for the rejection by the computing device 140, and a new control parameter value may be projected at block 402 taking into account the adjustment to the one or more processes 204.

If the projected control parameter values are indicated by the drilling operator or the computing device 140 to be within an acceptable operation range, the equipment 210 of the drilling system 100 may be controlled to operate at the projected control parameter values at block 408. That is, the drilling system 100 may begin drilling using the projected control parameter values provided at block 402. The projected control parameter values used at block 408 represent control parameter values that control the equipment 210 of the drilling system 100 at an optimized drilling rate based on present input data available to the one or more processes 204.

At block 410, real-time data relating to the drilling operation may be provided to the computing device 140. The real-time data may include data collected by the LWD downhole tool 108 and the MWD downhole tool 117. In an embodiment, the real-time data may include both formation data and equipment data. For example, the LWD downhole tool 108 may provide the computing device 140 with data relating to the composition of the formation 102 surrounding the wellbore 118. Alternatively, the MWD downhole tool 117 may provide the computing device 140 with data relating to the positioning of the drill bit 114 in addition to other data associated with the operation of the equipment 210 of the drilling system 100.

The data received at the computing device 140 may be used at block 406 to adjust the one or more processes 204 used to project the control parameter values of the equipment 210 of the drilling system 100. Further, the one or more processes 204 may be used at block 402 to project new projected control parameter values for the equipment 210. The new projected control parameter values may receive confirmation, at block 404, that the new projected control parameter values are still within the operational envelope of the equipment 210.

While the process 400 is described above with respect to the drilling system 100 and parameters used to control the equipment 210 of the drilling system 100, other operations using the process 400 are also contemplated within the scope of the present disclosure. For example, equipment associated with wellbore completions, wellbore stimulation, wellbore production, wellbore maintenance, or any other processes associated with the wellbore 118 may also make use of the process 400 with variations relating to the specific equipment used by each of the processes.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

In some aspects, systems, devices, and methods for operating wellbore equipment using a data-driven physics-based process are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a system comprising: equipment for at least one of forming a wellbore, stimulating the wellbore, or producing fluid from the wellbore; and a computing device operable to: project a control parameter value of the equipment using an equipment control process; receive confirmation that the projected control parameter value is within an allowable operating range; adjust the equipment control process based on the confirmation; control the equipment to operate at the projected control parameter value; receive real-time data associated with the forming of the wellbore, the stimulating of the wellbore, or the producing fluid from the wellbore; and adjust the equipment control process based on the real-time data.

Example 2 is the system of example 1, wherein the equipment control process comprises a stochastic optimization process, a deep learning process, a reinforced learning process, a production rule based process, or any combination thereof.

Example 3 is the system of examples 1-2, wherein the equipment control process comprises a stochastic optimization process, wherein inputs to the stochastic optimization process comprise outputs from a deep learning process, a reinforced learning process, and a production rule based process.

Example 4 is the system of examples 1-3, wherein the real-time data comprises formation data and equipment data.

Example 5 is the system of example 4, wherein the formation data comprises data received from measurement while drilling operations, logging while drilling operations, or any combination thereof.

Example 6 is the system of examples 1-5, wherein the control parameter value comprises a weight-on-bit value, a drill bit rotational speed value, or a combination thereof.

Example 7 is the system of examples 1-6, wherein the computing device is further operable to: project a new control parameter value using the equipment control process adjusted based on the confirmation and the real-time data; receive a new confirmation that the new projected control parameter is within the allowable operating range; and control the equipment to operate at the new control parameter value.

Example 8 is a method for controlling equipment associated with forming a wellbore, stimulating the wellbore, or producing fluid from the wellbore, the method comprising: projecting a control parameter value of the equipment using an equipment control process; receiving confirmation that the projected control parameter value is within an allowable operating range; adjusting the equipment control process based on the confirmation; controlling the equipment to operate at the projected control parameter value; receiving real-time data associated with the forming of the wellbore, the stimulating of the wellbore, or the producing fluid from the wellbore; and adjusting the equipment control process based on the real-time data.

Example 9 is the method of example 8, wherein the equipment control process comprises a stochastic optimization process, wherein inputs to the stochastic optimization process comprise outputs from a deep learning process, a reinforced learning process, and a production rule based process.

Example 10 is the method of examples 8-9, wherein the real-time data comprises formation data and equipment data.

Example 11 is the method of examples 8-10, wherein the real-time data comprises formation data comprising data received from measurement while drilling operations, logging while drilling operations, or any combination thereof.

Example 12 is the method of examples 8-11, wherein the real-time data comprises equipment data comprising weight-on-bit, torque-on-bit, drill bit rotational speed, smoothness of rotation, vibration, downhole temperature, or any combination thereof.

Example 13 is the method of examples 8-12, further comprising: projecting a new control parameter value using the equipment control process adjusted based on the confirmation and the real-time data; receiving a new confirmation that the new projected control parameter is within the allowable operating range; and controlling the equipment to operate at the new control parameter value.

Example 14 is a non-transitory computer-readable medium that includes instructions that are executable by a processing device to perform operations controlling equipment associated with a wellbore, the operations comprising: projecting a control parameter value of the equipment using an equipment control process; receiving confirmation that the projected control parameter value is within an allowable operating range; adjusting the equipment control process based on the confirmation; controlling the equipment to operate at the projected control parameter value; receiving real-time data associated with operation of the equipment within the wellbore; and adjusting the equipment control process based on the real-time data.

Example 15 is the non-transitory computer-readable medium of examples 14, wherein the equipment control process comprises a stochastic optimization process, a deep learning process, a reinforced learning process, a production rule based process, or any combination thereof.

Example 16 is the non-transitory computer-readable medium of examples 14-15, wherein the equipment control process comprises a stochastic optimization process, wherein inputs to the stochastic optimization process comprise outputs from a deep learning process, a reinforced learning process, and a production rule based process.

Example 17 is the non-transitory computer-readable medium of examples 14-16, wherein the real-time data comprises formation data and equipment data.

Example 18 is the non-transitory computer-readable medium of example 17, wherein the formation data comprises data received from measurement while drilling operations, logging while drilling operations, or any combination thereof.

Example 19 is the non-transitory computer-readable medium of example 17, wherein the equipment data comprises weight-on-bit, torque-on-bit, drill bit rotational speed, smoothness of rotation, vibration, downhole temperature, or any combination thereof.

Example 20 is the non-transitory computer-readable medium of examples 14-19, the operations further comprising: projecting a new control parameter value using the equipment control process adjusted based on the confirmation and the real-time data; receiving a new confirmation that the new projected control parameter is within the allowable operating range; and controlling the equipment to operate at the new control parameter value.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
    equipment for at least one of forming a wellbore, stimulating the wellbore, or producing fluid from the wellbore; and
    a computing device operable to:
        project a control parameter value of the equipment using an equipment control process;
        receive confirmation that the projected control parameter value is within an allowable operating range;
        control the equipment to operate at the projected control parameter value;
        receive real-time data associated with the forming of the wellbore, the stimulating of the wellbore, or the producing fluid from the wellbore;
        adjust the equipment control process based on the real-time data to generate a first adjusted equipment control process;
        project a second control parameter value using the first adjusted equipment control process;
        reject the second projected control parameter value that is outside the allowable operating range;
        adjust the first adjusted equipment control process based on the rejection to generate a second adjusted equipment control process; and
        project a new control parameter value of the equipment using the second adjusted equipment control process.

2. The system of claim 1, wherein the equipment control process comprises a stochastic optimization process, a deep learning process, a reinforced learning process, a production rule based process, or any combination thereof.

3. The system of claim 1, wherein the equipment control process comprises a stochastic optimization process, wherein inputs to the stochastic optimization process comprise outputs from a deep learning process, a reinforced learning process, and a production rule based process.

4. The system of claim 1, wherein the real-time data comprises formation data and equipment data.

5. The system of claim 4, wherein the formation data comprises data received from measurement while drilling operations, logging while drilling operations, or any combination thereof.

6. The system of claim 1, wherein the control parameter value comprises a weight-on-bit value, a drill bit rotational speed value, or a combination thereof.

7. The system of claim 1, wherein the computing device is further operable to:
    receive a second confirmation that the new projected control parameter value of the equipment is within the allowable operating range; and
    control the equipment to operate at the new control parameter value.

8. A method for controlling equipment associated with forming a wellbore, stimulating the wellbore, or producing fluid from the wellbore, the method comprising:
    projecting a control parameter value of the equipment using an equipment control process;
    receiving confirmation that the projected control parameter value is within an allowable operating range;
    controlling the equipment to operate at the projected control parameter value;
    receiving real-time data associated with the forming of the wellbore, the stimulating of the wellbore, or the producing fluid from the wellbore;
    adjusting the equipment control process based on the real-time data to generate a first adjusted equipment control process;
    projecting a second control parameter using the first adjusted equipment control process;
    rejecting the second projected control parameter value that is outside the allowable operating range;
    adjusting the first adjusted equipment control process based on the rejection to generate a second adjusted equipment control process; and
    projecting a new control parameter value of the equipment using the second adjusted equipment control process.

9. The method of claim 8, wherein the equipment control process comprises a stochastic optimization process, wherein inputs to the stochastic optimization process comprise outputs from a deep learning process, a reinforced learning process, and a production rule based process.

10. The method of claim 8, wherein the real-time data comprises formation data and equipment data.

11. The method of claim 8, wherein the real-time data comprises formation data comprising data received from measurement while drilling operations, logging while drilling operations, or any combination thereof.

12. The method of claim 8, wherein the real-time data comprises equipment data comprising weight-on-bit, torque-on-bit, drill bit rotational speed, smoothness of rotation, vibration, downhole temperature, or any combination thereof.

13. The method of claim 8, further comprising:
    receiving a second confirmation that the new projected control parameter value of the equipment is within the allowable operating range; and
    controlling the equipment to operate at the new control parameter value.

14. A non-transitory computer-readable medium that includes instructions that are executable by a processing device to perform operations controlling equipment associated with a wellbore, the operations comprising:
- projecting a control parameter value of the equipment using an equipment control process;
- receiving confirmation that the projected control parameter value is within an allowable operating range;
- controlling the equipment to operate at the projected control parameter value;
- receiving real-time data associated with operation of the equipment within the wellbore;
- adjusting the equipment control process based on the real-time data to generate a first adjusted equipment control process;
- projecting a second control parameter using the first adjusted equipment control process;
- rejecting the second projected control parameter value that is outside the allowable operating range;
- adjusting the first adjusted equipment control process based on the rejection to generate a second adjusted equipment control process; and
- projecting a new control parameter value of the equipment using the second adjusted equipment control process.

15. The non-transitory computer-readable medium of claim 14, wherein the equipment control process comprises a stochastic optimization process, a deep learning process, a reinforced learning process, a production rule based process, or any combination thereof.

16. The non-transitory computer-readable medium of claim 14, wherein the equipment control process comprises a stochastic optimization process, wherein inputs to the stochastic optimization process comprise outputs from a deep learning process, a reinforced learning process, and a production rule based process.

17. The non-transitory computer-readable medium of claim 14, wherein the real-time data comprises formation data and equipment data.

18. The non-transitory computer-readable medium of claim 17, wherein the formation data comprises data received from measurement while drilling operations, logging while drilling operations, or any combination thereof.

19. The non-transitory computer-readable medium of claim 17, wherein the equipment data comprises weight-on-bit, torque-on-bit, drill bit rotational speed, smoothness of rotation, vibration, downhole temperature, or any combination thereof.

20. The non-transitory computer-readable medium of claim 14, the operations further comprising:
- receiving a second confirmation that the new projected control parameter value of the equipment is within the allowable operating range; and
- controlling the equipment to operate at the new control parameter value.

* * * * *